April 19, 1960     H. C. THAYER, JR     2,933,412
METHOD OF PROTECTING SOLDER-COATED ARTICLES
Filed Aug. 15, 1957
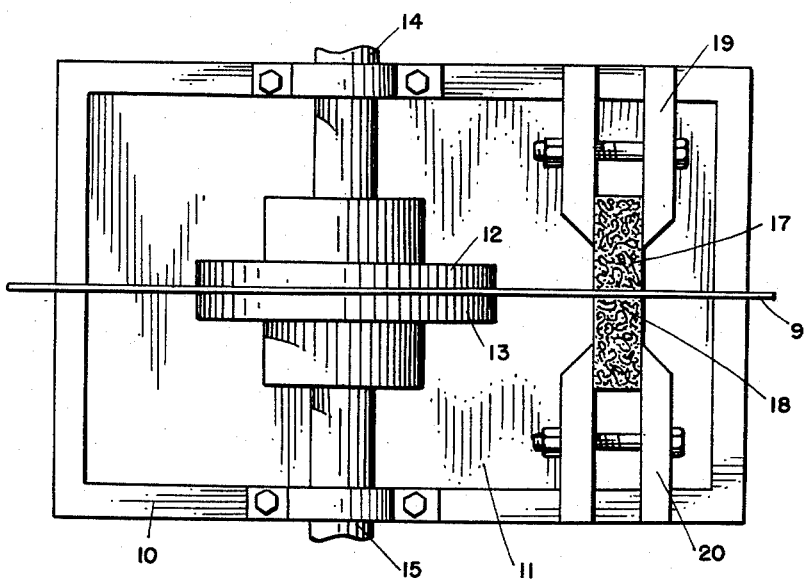
INVENTOR:
H. C. THAYER, JR.
BY
ATT'Y

2,933,412

METHOD OF PROTECTING SOLDER-COATED ARTICLES

Harry C. Thayer, Jr., Maywood, Ohio, assignor to Western Electric Company, Incorporated, New York, N.Y., a corporation of New York Application August 15, 1957, Serial No. 678,367

3 Claims. (Cl. 117—71)

This invention relates to methods of protecting and preserving solder coatings from contamination and is a continuation in part of application Serial No. 414,411, filed March 5, 1954, by H. C. Thayer, Jr., for "Soldering Wiper and Lubricant," now abandoned.

In the coating with tin or solder of edge portions of thin strips of metal, such as brass, nickel silver, Phosphor bronze or steel, to form stock from which electrical contact springs may be punched, the strips are sometimes advanced over a solder bath between a pair of applicator wheels which lift solder into engagement with the edge portions of the strip to coat them with solder. This does not always leave a uniform coating of solder thereon, and wiping devices are sometimes used to wipe the molten solder to smooth it. If the strip is stored for any length of time, the solder oxidizes to a certain extent, thereby rendering soldering operations more difficult.

An object of this invention is to provide a method of preserving solder coatings.

Another object of this invention is to provide a method for smoothing solder coatings and for protecting them from oxidation during storage.

With these and other objects in mind, this invention contemplates a method of protecting and preserving solder coatings comprising applying an ester of a polyhydric alcohol and a fatty acid and a polyalkylene glycol to an article having a solder coating to be protected.

A complete understanding of the invention may be obtained by the following detailed description of a method when read in conjunction with the appended drawing in which the single figure is a top plan view of an apparatus for applying a preservative to a molten solder coating while smoothing the coating.

Referring now in detail to the drawing, there is shown a container 10 having molten solder 11 therein which is to be applied to opposed sides of a metallic strip 9 near one edge thereof to form stock from which electrical contact springs or the like may be punched. The strip 9 is advanced from left to right above the upper level of the solder 11, and discs 12 and 13, which dip into the solder 11, are rotated by shafts 14 and 15 to lift the solder from the bath and apply it to the edge portions of the strip near the bottom edge thereof. After the solder is applied to the bottom edge portions of the strip 9, the strip is advanced between asbestos wipers consisting of pieces of graphited braided asbestos packing material 17 and 18 which are held into pressing engagement with the lower portion of the strip 9 by holders 19 and 20, respectively.

The asbestos wipers are impregnated with graphite and have applied to the portions thereof in contact with the strip 9 a preservative composed essentially of a carrier comprising polyalkylene glycol and conditioning additive comprising a diester of a glycol and monocarboxylic fatty acid. The amount of graphite in the asbestos wiper is approximately 5% by weight, i.e., 5% of the weight of the wiper. The preservative is then placed on and coats the bottom edge portions of the strip 9 with very thin films. These films of the preservative prevent formation of oxides on the solder that are deleterious to subsequent soldering and the preservative films do not interfere with subsequent soldering even though the preservative is not removed.

Examples of satisfactory carrier portions of the preservative are polyhydric alcohols, such as ethylene glycol, propylene glycol, and examples of the additives thereto are ethylene glycol distearate, propylene glycol distearate, ethylene glycol dipalmitate and propylene glycol dipalmitate. Other esters of other polyhydric alcohols and other saturated fatty acids also are satisfactory for use as the additive to the carrier.

The preservatives are preferably in paste form but may be highly fluid if desired, and serve to coat the solder covered portions of the strip. One very satisfactory preservative comprises approximately 65% ethylene glycol and 35% ethylene glycol distearate. Solder strips coated with this preservative were stored for several months and were subsequently soldered without further treatment of the surfaces.

It is to be understood that the above-described arrangements are simply illustrative of the application of the principles of the invention. Numerous other arrangements may be radily devised by those skilled in the art which will embody the principles of the invention and fall within the spirit and scope thereof.

What is claimed is:

1. The method of smoothing and protecting an article having molten solder thereon, which comprises wiping the molten solder on the article with a fibrous wiper impregnated with graphite and carrying a composition composed of about 65% propylene glycol and the remainder a diester of ethylene glycol and palmitic acid, said wiping being carried out while the solder is in a molten state, whereby the solder is smoothed on the article and is provided with a protective coating which prevents deterioration of the solder for prolonged periods but permits subsequent soldering operations to be performed with the solder without removal of the coating.

2. The method of smoothing and protecting an article having molten solder on at least one side thereof, which comprises wiping the molten solder on the article with a braided asbestos wiper impregnated with graphite and carrying a paste composed of about 65% propylene glycol and the remainder a diester of ethylene glycol and palmitic acid, said wiping being performed while the solder is in a molten state, whereby the solder is smoothed on the article and is provided with a protective coating which prevents deterioration of the solder for prolonged periods but permits subsequent soldering operations to be performed without removal of the coating.

3. The method of applying solder to a strip of material, which comprises covering a portion of a metal strip with molten solder, and wiping the molten solder on the strip with a fibrous asbestos wiper impregnated with sufficient lubricating and protective material to remove excess solder, smooth the solder and provide the solder with a protective coating, said wiping being performed while the solder is in a molten state, said lubricating and protective material consisting of graphite and a paste composed of about 65% propylene glycol and the remainder a diester of ethylene glycol and palmitic acid, said paste forming a coating on the solder which prevents deterioration of the solder for prolonged periods but permits subsequent soldering operations to be performed with the solder without removal of the coating.

References Cited in the file of this patent

UNITED STATES PATENTS

| | | |
|---|---|---|
| 1,918,197 | Sebell | July 11, 1933 |
| 2,363,597 | Jones | Nov. 28, 1944 |
| 2,494,559 | Jubanowsky | Jan. 17, 1950 |
| 2,672,443 | Screnock | Mar. 16, 1954 |

FOREIGN PATENTS

| | | |
|---|---|---|
| 827,846 | France | May 4, 1938 |

OTHER REFERENCES

How and Where to Use Electric Furnace Brazing, by H. M. Webber, by General Electric, Nov. 3, 1938, page 22.

Carbowax Compounds and Polyethylene Glycols by Carbide & Carbon-Chemicals Corp., 30 E. 42d St., New York 17, N.Y., 1946, pp. 3–7.